Patented Jan. 2, 1940

2,185,354

UNITED STATES PATENT OFFICE 2,185,354

COMPOSITION FOR MOLDING

Silvio Pellerano, Brooklyn, N. Y., assignor to Garfield Manufacturing Company, Garfield, N. J., a corporation of New Jersey No Drawing. Application March 13, 1937, Serial No. 130,675

19 Claims. (Cl. 260—28)

My invention relates to a composition of matter, and a process of making same of such a nature as to be suitable for the production of numerous articles now in domestic and industrial use, by molding, and subsequently hardening in ovens under relatively high temperatures.

An important object of this invention is to provide a composition which, when formed into the desired shapes, will have electric insulating properties and great toughness, so that the appliances made from it can successfully withstand ordinary usage.

Another object is to provide a composition that, when worked into the shape necessary to serve the purpose in view can be repeatedly subjected to heat without suffering deterioration, loss of durability or any reduction in impact strength or capacity to resist jars and knocks.

A further object is to provide a composition which will mold readily, rapidly and cheaply without requiring external lubricants such as stearates, glycerine and water now commonly employed to facilitate removal from the cavity of the molding apparatus.

Still another object is to provide a composition which is virtually free of volatile solvents.

It is also an object of the invention to provide a material which shall be non-porous and impervious to moisture.

An additional object of the invention is to provide a composition which, after being molded, may be hardened primarily by oxidation, polymerization, vulcanization and condensation.

It is also an object of this invention to provide a composition that is made up of a filler and a binder and contains in addition a quantity of plasticizing agent, to render the handling easy and to increase the molding and heat-resisting qualities thereof.

These and other objects and advantages will appear in the ensuing description, in which I set forth in detail several preferred embodiments and modes of procedure. But the disclosure is by way of example only, and I may alter the materials used, the proportions thereof, and the methods of treating same without departing from the principle of the invention or exceeding its scope and spirit, as fully as is consistent with the broad and general meanings of the terms in which the appended claims are expressed.

Subsequent to the disclosures set forth in United States Patent No. 869,321, granted to Robert Mueller of Germany, on October 29, 1907, and United States Patent No. 1,025,268, granted to Emile Hemming, on May 7, 1912, numerous modifications and advances upon said methods have been elaborated, and many patents for improvements thereon have been issued. The aforesaid patents describe the use of coal-tar pitch as binder which, after being mixed by the aid of solvents with asbestos as a filler is molded at ordinary temperature, and the articles are subjected to heat to remove the solvents and harden the binder.

Coal-tar pitch has in later patents been replaced by asphalts such as gilsonite and oil asphalts, and methods of removing the free carbon from said coal-tar pitch have been claimed. The introduction of fixed oils has also been tried to strengthen it. With these variations in bituminous materials, oils and solvents, the general aspect of the art has been always about the same. The aim has been chiefly to get materials of higher strength and finish, while retaining the essential refractoriness or ability to resist heat.

The usual process of manufacturing the previously described compositions has been to prepare a binder by melting bituminous materials such as pitches, asphalts with or without the addition of resins, together with certain amounts of suitable oils, such as linseed oil, castor oil or fish oil and thinning the mixture down with solvents such as benzol. The binder is then mixed with a filler such as asbestos fibre in a mixing machine with a kneading or similar action. The whole mass is commingled until a uniform powder or granular mixture is obtained which, after being aged or conditioned, is pressed in dies at room temperature. To avoid sticking to the die a lubricant such as zinc stearate is added or else the powder is dampened with water. Glycerine has also been used.

In the present invention the binder is carefully compounded so as to obtain definite chemical reactions so far as known, resulting in a material far superior to any previous one in molding qualities. The material may be formed without external lubrication and without the application of heat excepting in such a degree, usually not very high, as may be desired to improve conditions of flow of the material or maintain constant conditions of operation when necessary.

In making the new composition I prepare the binder by taking oil such as linseed, China-wood, oiticica, castor or fish oil and blend it with coumarone-indene resin to give a short oil varnish, to which is added a resin of the glycerol-phthalate type and a bituminous substance such as animal or vegetable pitch; and the whole is blended completely to give a uniform mixture.

To this a very limited amount of solvent is added to keep the material soft enough to be used. As a binder of high viscosity and surface tension is desired the usual practice of using large amounts of solvents is discarded. The solvents are selected from materials which will leave no carbon residue on distillation. I believe that the binder so prepared hardens by polymerization, oxidation, vulcanization and condensation and that a negligible amount of distillation takes place.

As an example, the substance used to make a composition according to my invention may be taken in the following relative quantities.

For the binder, by weights:

| | |
|---|---|
| Raw China-wood oil | 4 to 8 parts |
| Linseed oil | 4 to 8 parts |
| Coumarone-indene resin | 16 to 30 parts |
| Glycerol phthalate resin | 4 to 8 parts |
| Stearine pitch | 40 to 80 parts |
| High flash naphtha | 4 to 8 parts |
| Solvent naphtha | 8 to 16 parts |

For the filler, by weight:

| | |
|---|---|
| Asbestos | 500–800 parts according to fibre |
| Sulphur | 7% to 10% of the amount of asbestos |

When the binder and filler have been commingled, ½ to 3% of a plasticizer such as tricresyl phosphate, triphenyl phosphate or diethyl phthalate or chlorinated diphenyls is incorporated.

To prepare the binder, I employ the steps set forth below:

About 6 parts of raw China-wood oil are heated rapidly to 450 degrees F., and 6 parts of linseed oil are then added as a check and the temperature raised to 450 degrees again. 12 parts of coumarone-indene resin is added whereupon the temperature is increased to 550 degrees F. When this temperature has been reached another 12 parts of coumarone-indene resin are added and the temperature brought to 500 degrees F. The mixture is kept at this temperature for about ½ hour and 12 parts of a glycerol-phthalate resin are then added followed by 60 parts of animal pitch. The whole is kept for about ½ hour at 400 degrees F. and then the heat removed. When the binder has cooled to about 300–350 degrees 6 parts of high-flash naphtha are added followed by 12 parts of solvent naphtha at 200–250 degrees F. The binder is now made up. The amount of solvents may be varied to obtain a binder of the desired viscosity.

To (say) 600 parts of short asbestos fibres 7 to 10% of their weight in sulphur in a pulverized form is added and the whole mixed in a suitable mixing machine. When the intermingling is completed 180–190 parts of binder are added and the whole is mixed until quite uniform, and then ½ to 3% tricresyl phosphate is added. The addition of this is to plasticize the mass. The composition is then disintegrated and screened in the usual way. It may now be stored in barrels, and it is usually ready for use after 3 or 4 days. If too soft it may be spread out to dry and if too hard it may be worked in a machine with ½ to 3% mineral spirits. The mix is worked to a predetermined degree of plasticity as measured by any of the well known plasticity devices. The composition is kept mixing in the machine until the desired apparent density as measured by known methods is obtained.

It is to be noted that this composition is made to a predetermined degree of apparent density and plasticity.

In another example the same procedure is adopted but instead of China-wood oil and linseed oil, China-wood oil and oiticica oil in the same proportions are used.

Also a double quantity of China-wood oil may be used instead of a mixture of linseed and China-wood oil; or twelve parts of oiticica oil can be selected instead of a mixture of China-wood oil and linseed.

In still another example twelve parts of a processed castor oil is used instead of China-wood and linseed oil.

Also twelve parts of fish oil may be used instead of the China-wood and linseed oil.

The composition may be formed in dies by any known method such as direct pressure, extrusion or injection at suitable temperatures.

The composition may be fed to the dies by means of hoppers or it may first be preformed in a preforming press or by extrusion. The formed article is then baked to harden by oxidation, polymerization, vulcanization or condensation, for about 24 hours at gradually increasing temperatures ranging up to 500 degrees F. and varying in accordance with the size of the formed article.

It is understood that any fatty-acid pitch may be employed as well as any kind of coumarone-indene resin and any oxidizable or polymerizable oil. Any of the different alkyd resins may also be utilized.

Any materials suitable as a plasticizer may be substituted for the tricresyl phosphate, such as triphenyl phosphate or diethylphthalate, or chlorinated diphenyls. I believe plasticizers of relatively high boiling points, such as tricresyl phosphate and chlorinated diphenyls, aid materially in imparting heat-resisting properties to the composition.

I can of course employ other fillers, along with the asbestos, such as talc, clay, etc., as well as organic fillers such as wood flour or flock.

I can add pigments when a particular color is desirable. The composition above set forth is for black articles. Another formula for making a composition to give black molded articles is:

| | Parts by weight |
|---|---|
| Talc | 180 |
| Asbestos | 540 |
| Sulphur | 54 |
| Carbon black | 9 |
| Red oxide of iron | 2 |
| Binder | 180 |

One of the said plasticizers is used and the process outlined above is followed.

For brown colored molded articles, made in the same way, the following formulas can be taken.

| | Parts by weight |
|---|---|
| Asbestos | "Floats" 600 |
| Fibre | "o-o-5-11" 200 |
| Red oxide of iron | 60 |
| Sulphur | None |
| Binder | 220 | and ½ to 3% tricresyl-phosphate added as plasticizer.

Or the following:

| | Parts by weight |
|---|---|
| Asbestos | 1000 |
| Sulphur | 80 |
| Red oxide of iron | 80 |
| Binder | 220 |
| Plasticizer | 15 |
| Mineral spirits | 15 |

With a composition having the above characteristics an article may be formed and after hardening by curing as above described it possesses so much toughness and strength as to be virtually unbreakable by any accidental knocks or impact it is liable to receive. The composition flows easily in the mold cavity, and may be formed to the required shape without the use of any external lubricant, or application of heat excepting as may be desired to accelerate flow or control constant conditions of operation. It may then be hardened in ovens, by subjecting it to a gradual increase in heat up to 500 degrees F. or thereabout, for a period of about 24 hours or so. Since it contains little or no solvents, there is scarcely any distillation products and the hardening is due more to processes of oxidation, polymerization, condensation, vulcanization or similar chemical reactions as hereinbefore stated. The absence of distillation reduces porosity with a resultant material impervious to moisture.

Having described my invention, what I believe to be new and desire to secure and protect by Letters Patent of the United States is:

1. A molding composition containing substantially 180 to 190 parts by weight of a binder made up of substantially 8 to 16 parts of oil, 16 to 30 parts of a coumarone-indene resin, 4 to 8 parts of glycerol-phthalate resin, 40 to 80 parts of pitch, 12 to 24 parts of solvent, and substantially from 500 to 800 parts of inert filler mixed with a small percentage of a plasticizer.

2. The molding composition according to claim 1, wherein the plasticizer is one of group consisting of tricresyl phosphate, triphenyl phosphate, diethyl phthalate, and chlorinated diphenyls.

3. The molding composition according to claim 1 wherein the solvent consists of 4 to 8 parts of high flash naphtha and 8 to 16 parts of solvent naphtha.

4. The molding composition according to claim 1, wherein the oil consists of 4 to 8 parts of China-wood oil and 4 to 8 parts of an oil which is one of a group consisting of linseed oil, oiticica oil, castor oil and fish oil.

5. The molding composition according to claim 1 wherein China-wood oil only is used as the said oil.

6. The molding composition according to claim 1 wherein the oil used is oiticica oil alone.

7. The molding composition according to claim 1 wherein the oil used is castor oil in the quantity named.

8. A molding composition made up of substantially 180 to 190 parts by weight of a binder containing approximately 8 to 16 parts of oil, 16 to 30 parts of resin belonging to the coumarone-indene group, 4 to 8 parts of glycerol phthalate resin, 40 to 80 parts of pitch, 12 to 24 parts of solvents, and from 500 to 800 parts by weight of inert filler, with sulphur of 7 to 10 percent of the weight thereof and a smaller percentage of a plasticizer which is one of a group consisting of tricresyl phosphate, triphenyl phosphate, diethyl-phthalate and chlorinated diphenyls.

9. The process of preparing a molding composition which consists in making a binder out of the substances enumerated in claim 1 by heating the oil to 450 degrees F., adding half the first named resin and raising the temperature to 550 degrees, adding the remaining half and maintaining the temperature at 500 degrees F., for about one half hour; adding in succession the glycerol-phthalate resin and stearine pitch, keeping the entire mass now at 400 degrees F. for half an hour, cooling to 300–350 degrees F., adding part of the solvent, and then the remainder at 200 to 250 degrees F., mixing in the filler with the plasticizer, thoroughly commingling all the ingredients, and finally screening the composition.

10. A molding composition made up of substantially 600 parts by weight of asbestos of one fiber and 200 parts by weight of a different fiber, 60 parts by weight of red oxide of iron, 220 parts by weight of binder, and a relatively small quantity of plasticizer.

11. A molding composition made up of substantially 1000 parts by weight of asbestos, 80 parts by weight of sulphur, 220 parts by weight of binder, 80 parts by weight of red oxide of iron, and a plasticizer which is one of a group consisting of tricresyl phosphate, triphenyl phosphate, diethyl phthalate and chlorinated diphenyls.

12. A molding composition made up of a filler consisting of substantially 180 parts by weight of talc and 540 parts by weight of asbestos, 54 parts by weight of sulphur, 180 parts by weight of binder, 9 parts by weight of carbon black and 2 parts by weight of red oxide of iron, with a plasticizer which is one of a group consisting of tricresyl phosphate, triphenyl phosphate, diethyl phthalate and chlorinated diphenyls.

13. A molding composition made up of substantially 8 to 16 parts by weight of oil, 16 to 30 parts coumarone-indene resin, 4 to 8 parts of glycerol-phthalate resin, 40 to 80 parts of stearine pitch, 12 to 24 parts of solvent and a relatively large quantity of filler with a small percentage of a plasticizer which is one of a group consisting of tricresyl phosphate, triphenyl phosphate, and diethyl phthalate and chlorinated disphenyl.

14. A molding composition made up of 8 to 16 parts of oil, 16 to 30 parts of coumarone-indene resin, 4 to 8 parts of glycerol-phthalate resin, 40 to 80 parts of stearine pitch, 4 to 8 parts of high flash naphtha, 8 to 16 parts of solvent naphtha, a relatively large quantity of filler, a small percentage of sulphur and a smaller percentage of plasticizer which is one of a group consisting of tricresyl phosphate, triphenyl phosphate, diethyl phosphate and chlorinated diphenyls.

15. A molding composition made up of substantially 1000 parts by weight of asbestos, 80 parts by weight of sulphur, 220 parts by weight of binder, 80 parts by weight of red oxide of iron, and a plasticizer.

16. A molding composition made up of substantially 180 to 190 parts by weight of a binder containing approximately 8 to 16 parts of oil, 16 to 30 parts of resin belonging to the coumarone-indene group, 4 to 8 parts of glycerol-phthalate resin, 40 to 80 parts of pitch, 12 to 24 parts of solvents, and from 500 to 800 parts by weight of inert filler, with sulphur of 7 to 10 percent of the weight thereof and a smaller percentage of a plasticizer.

17. The composition according to claim 1 adapted to be given form at a selected temperature and hardened by oxidation, polymerization, condensation and vulcanization substantially without distillation of any of its contents.

18. An article made from the composition according to claim 1, molded into form at a selected temperature, and hardened by oxidation, polymerization, condensation and vulcanization, with substantially no distillation of contents, so that said article has no porosity and is impervious to moisture.

19. A molding composition made up of 8 to 16 parts of oil, 16 to 30 parts of coumarone-indene resin, 4 to 8 parts of glycerol-phthalate resin, 40 to 80 parts of stearine pitch, 4 to 8 parts of high flash naphtha, 8 to 16 parts of solvent naphtha, a relatively large quantity of filler, a small percentage of sulphur and a small percentage of plasticizer which is one of a group consisting of tricresyl phosphate, triphenyl phosphate, diethyl phosphate and chlorinated diphenyls, to enable said comopsition to be molded in form and set by oxidation, polymerization, condensation and vulcanization.

SILVIO PELLERANO.